US012812578B2

(12) United States Patent
Kucera

(10) Patent No.: US 12,812,578 B2
(45) Date of Patent: Nov. 24, 2026

(54) METHODS AND APPARATUSES FOR POSITIONING

(71) Applicant: Nokia Technologies Oy, Espoo (FI)

(72) Inventor: Stepan Kucera, Munich (DE)

(73) Assignee: Nokia Technologies Oy, Espoo (FI)

( * ) Notice: Subject to any disclaimer, the term of this patent is extended or adjusted under 35 U.S.C. 154(b) by 304 days.

(21) Appl. No.: 18/396,881

(22) Filed: Dec. 27, 2023

(65) Prior Publication Data

US 2024/0267864 A1 Aug. 8, 2024

Related U.S. Application Data

(60) Provisional application No. 63/483,038, filed on Feb. 3, 2023.

(51) Int. Cl.
*H04L 12/00* (2006.01)
*H04W 56/00* (2009.01)

(52) U.S. Cl.
CPC ..... *H04W 56/0045* (2013.01); *H04W 56/006* (2013.01)

(58) Field of Classification Search
CPC ..... H04W 56/00; H04W 12/63; H04W 64/00; H03W 12/122; G01S 5/02
USPC ........................................................ 370/350
See application file for complete search history.

(56) References Cited

U.S. PATENT DOCUMENTS 6,366,574 B1 * 4/2002 Baissus .................... H04L 7/10 370/514
8,134,990 B2 * 3/2012 Kangas ................. G01S 5/0215 370/441
8,619,755 B2 * 12/2013 Wang .................... H04L 12/413 375/376
8,730,925 B2 * 5/2014 Frank ........................ G01S 5/10 370/336
11,388,693 B2 * 7/2022 Selvaganapathy .... H04W 64/00
11,785,564 B2 * 10/2023 Kwon ................ H04W 56/001 370/350
2015/0092768 A1 * 4/2015 Ng ....................... H04W 48/16 370/350

(Continued)

FOREIGN PATENT DOCUMENTS

WO WO-2021061338 A1 * 4/2021 .......... G01S 13/878
WO WO-2021076037 A1 * 4/2021 ........... H04W 64/00
WO 2021/178228 A1 9/2021

(Continued)

OTHER PUBLICATIONS

Extended European Search Report received for corresponding European Patent Application No. 23213361.1, dated May 28, 2024, 7 pages.

(Continued)

*Primary Examiner* — Frantz Coby
(74) *Attorney, Agent, or Firm* — Lippes Mathias LLP

(57) ABSTRACT

Embodiments of the present disclosure disclose methods, apparatuses and computer readable medium for positioning. A terminal device obtains timing advance information of one or more network nodes. The timing advance information indicates at least a timing advance value corresponding to one of the one or more network nodes. Moreover, the terminal device performs, using the obtained timing advance information, integrity check of a positioning reference signal.

20 Claims, 8 Drawing Sheets

(56) References Cited

U.S. PATENT DOCUMENTS

| | | | | |
|---|---|---|---|---|
| 2016/0165560 | A1* | 6/2016 | Takeda ................ | H04W 56/002 370/350 |
| 2021/0153158 | A1 | 5/2021 | Agarwal et al. | |

FOREIGN PATENT DOCUMENTS

| | | | |
|---|---|---|---|
| WO | 2022/081893 | A1 | 4/2022 |
| WO | 2022/154989 | A1 | 7/2022 |
| WO | 2022/199689 | A1 | 9/2022 |
| WO | 2022/246344 | A1 | 11/2022 |

OTHER PUBLICATIONS

"3rd Generation Partnership Project, Technical Specification Group Services and System Aspects Study on 5G Security Enhancement against False Base Stations (FBS) (Release 18 )", 3GPP TR 33.809, V0.18.0, Feb. 2022, pp. 1-130.

"Running 38.305 CR for Positioning WI on RAT dependent positioning methods", 3GPP TSG-RAN2 Meeting #116-e, R2-2111636, Intel Corporation, Nov. 1-11, 2021, 17 pages.

"3rd Generation Partnership Project; Technical Specification Group Radio Access Network; LTE Positioning Protocol (LPP (Release 17)", 3GPP TS 37.355, V17.2.0, Sep. 2022, pp. 1-347.

"3rd Generation Partnership Project; Technical Specification Group Radio Access Network; NR; Medium Access Control (MAC) protocol specification (Release 17)", 3GPP TS 38.321, V17.2.0, Sep. 2022, pp. 1-246.

"Discussion on Positioning in RRC Inactive state", 3GPP RAN WG2 Meeting #116bis-e, R2-2201186, Agenda: 8.11.3, InterDigital Inc., Jan. 17-25, 2022, pp. 1-7.

* cited by examiner

Figure 2a: 4-step RACH

METHODS AND APPARATUSES FOR POSITIONING

RELATED APPLICATION

This application claims priority to, and the benefit of, U.S. Provisional Application No. 63/483,038, filed on Feb. 3, 2023, the contents of which is incorporated herein by reference in its entirety.

FIELD

Embodiments of the present disclosure generally relate to the field of communication, and in particular, to methods, apparatuses and computer readable medium for positioning.

BACKGROUND

In Release 18 of 3rd Generation Partnership Project (3GPP) radio access network (RAN) meeting, there was an interest to extend the study on new radio (NR) positioning enhancements conducted in Release 17. Therefore, it was agreed and approved to have a study on expanded and improved NR positioning.

One of the objectives of the study targets on improving accuracy, integrity and power efficiency in NR positioning. However, how to achieve positioning integrity in NR positioning is currently not clear, for example, sproofer of a reference signal.

SUMMARY

In general, example embodiments of the present disclosure provide methods, apparatuses and computer readable medium for positioning.

In a first aspect, there is provided a terminal device. The terminal device comprises one or more transceivers; and one or more processors coupled to the one or more transceivers, and the one or more transceivers are configured, with the one or more processors, to cause the terminal device to: obtain timing advance, TA, information of one or more network nodes, wherein the TA information indicates at least a TA value corresponding to one of the one or more network nodes; and perform, using the obtained TA information of the one or more network nodes, integrity check of a positioning reference signal, PRS; or report, to a location management function, LMF, the obtained TA information of the one or more network nodes for the integrity check of the PRS.

The above aspect enables the terminal device to determine the authenticity of the PRS, for example to determine whether the transmission of the PRS is from a genuine network node, or from a malicious network node (e.g., a spoofer) or a malfunctioning network node (e.g., a misconfigured network node). Advantageously, the integrity check of the PRS and/or the TA information enables the terminal device to identify spoofing of PRS and perform necessary mitigation actions to avoid positioning error of the terminal device.

In a second aspect, there is provided a positioning entity. The positioning entity comprises one or more transceivers; and one or more processors coupled to the one or more transceivers, and the one or more transceivers are configured, with the one or more processors, to cause the positoning entity to: obtain timing advance, TA, information of one or more network nodes, or an integrity check result of a positioning reference signal, PRS, wherein the TA information indicates at least a TA value corresponding to one of the one or more network nodes; and determine, based on the obtained TA information or integrity check result, whether the PRS is valid for positioning of a terminal device.

The above aspect enables the the LMF to determine the authenticity of the PRS, for example to determine whether the transmission of the PRS is from a genuine network node, or from a malicious network node (e.g., a spoofer) or a malfunctioning network node (e.g., a misconfigured network node). Advantageously, the integrity check of the PRS and/or the TA information enables the LMF to identify spoofing of PRS and perform necessary mitigation actions to avoid positioning error of the terminal device.

In a third aspect, there is provided a method implemented at a terminal device. The method comprises: obtaining timing advance, TA, information of one or more network nodes, wherein the TA information indicates at least a TA value corresponding to one of the one or more network nodes; and performing, using the obtained TA information of the one or more network nodes, integrity check of a positioning reference signal, PRS; or reporting, to a location management function, LMF, the obtained TA information of the one or more network nodes for the integrity check of the PRS.

In a fourth aspect, there is provided a method implemented at a positioning entity. The method comprises: obtaining timing advance, TA, information of one or more network nodes, or an integrity check result of a positioning reference signal, PRS, wherein the TA information indicates at least a TA value corresponding to one of the one or more network nodes; and determining, based on the obtained TA information or integrity check result whether the PRS is valid for positioning of a terminal device.

In a fifth aspect, there is provided an apparatus of a terminal device. The apparatus comprises: means for obtaining timing advance, TA, information of one or more network nodes, wherein the TA information indicates at least a TA value corresponding to one of the one or more network nodes; and means for performing, using the obtained TA information of the one or more network nodes, integrity check of a positioning reference signal, PRS; or means for reporting, to a location management function, LMF, the obtained TA information of the one or more network nodes for the integrity check of the PRS.

In a sixth aspect, there is provided an apparatus of a positioning entity. The apparatus comprises: means for obtaining timing advance, TA, information of one or more network nodes, or an integrity check result of a positioning reference signal, PRS, wherein the TA information indicates at least a TA value corresponding to one of the one or more network nodes; and means for determining, based on the obtained TA information or integrity check result whether the PRS is valid for positioning of a terminal device.

In a seventh aspect, there is provided a terminal device. The terminal device comprises at least one processor; and at least one memory including computer program codes, wherein the at least one memory and the computer program codes are configured to, with the at least one processor, cause the terminal device to: obtain timing advance, TA, information of one or more network nodes, wherein the TA information indicates at least a TA value corresponding to one of the one or more network nodes; and perform, using the obtained TA information of the one or more network nodes, integrity check of a positioning reference signal, PRS; or report, to a location management function, LMF, the obtained TA information of the one or more network nodes for the integrity check of the PRS.

In an eighth aspect, there is provided a positioning entity. The positioning entity comprises at least one processor; and at least one memory including computer program codes, wherein the at least one memory and the computer program codes are configured to, with the at least one processor, cause the positioning entity to: obtain timing advance, TA, information of one or more network nodes, or an integrity check result of a positioning reference signal, PRS, wherein the TA information indicates at least a TA value corresponding to one of the one or more network nodes; and determine, based on the obtained TA information or integrity check result whether the PRS is valid for positioning of a terminal device.

In a ninth aspect, there is provided a non-transitory computer readable medium comprising program instructions for causing an apparatus to perform at least the method according to third or fourth aspect.

In a tenth aspect, there is provided a computer program comprising instructions, which, when executed by an apparatus, cause the apparatus at least to: obtain timing advance, TA, information of one or more network nodes, wherein the TA information indicates at least a TA value corresponding to one of the one or more network nodes; and perform, using the obtained TA information of the one or more network nodes, integrity check of a positioning reference signal, PRS; or report, to a location management function, LMF, the obtained TA information of the one or more network nodes for the integrity check of the PRS.

In an eleventh aspect, there is provided a computer program comprising instructions, which, when executed by an apparatus, cause the apparatus at least to: obtain timing advance, TA, information of one or more network nodes, or an integrity check result of a positioning reference signal, PRS, wherein the TA information indicates at least a TA value corresponding to one of the one or more network nodes; and determine, based on the obtained TA information or integrity check result whether the PRS is valid for positioning of a terminal device.

In a twelfth aspect, there is provided a terminal device. The terminal device comprises receiving circuitry configured to obtain timing advance, TA, information of one or more network nodes, wherein the TA information indicates at least a TA value corresponding to one of the one or more network nodes; and configured to perform, using the obtained TA information of the one or more network nodes, integrity check of a positioning reference signal, PRS; or configured to report, to a location management function, LMF, the obtained TA information of the one or more network nodes for the integrity check of the PRS.

In a thirteenth aspect, there is provided a positioning entity. The positioning entity comprises obtaining circuitry configured to obtain timing advance, TA, information of one or more network nodes, or an integrity check result of a positioning reference signal, PRS, wherein the TA information indicates at least a TA value corresponding to one of the one or more network nodes; and configured to determine, based on the obtained TA information or integrity check result whether the PRS is valid for positioning of a terminal device.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
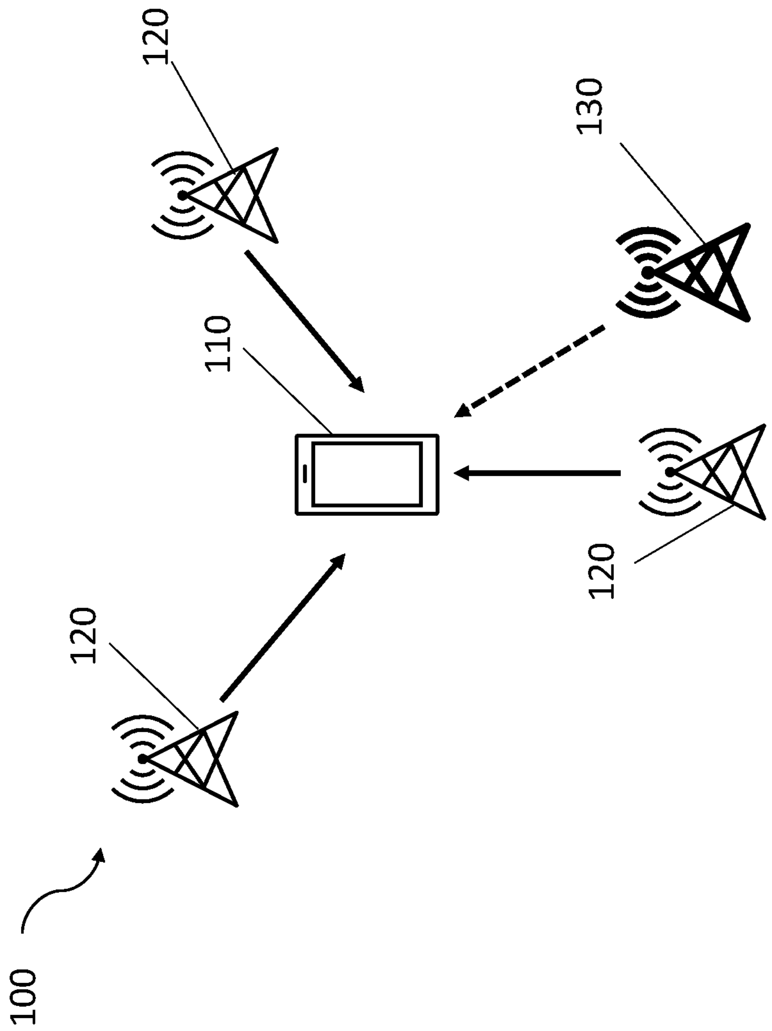
FIG. 1 illustrates an example radio network in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms “a”, “an” and “the” are intended to include the plural forms as well, unless the context clearly indicates otherwise. It will be further understood that the terms “comprises”, “comprising”, “has”, “having”, “includes” and/or “including”, when used herein, specify the presence of stated features, elements, and/or components etc., but do not preclude the presence or addition of one or more other features, elements, components and/or combinations thereof. As used herein, “at least one of the following: <a list of two or more elements>” and “at least one of <a list of two or more elements>” and similar wording, where the list of two or more elements are joined by “and” or “or”, mean at least any one of the elements, or at least any two or more of the elements, or at least all the elements.

As used in this application, the term “circuitry” may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term “communication network” refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term “network node” refers to a node in a communication network via which a terminal device accesses the network and receives services therefrom. The network node may refer to a base station (BS) or an access point (AP), for example, a node B (NodeB or NB), an evolved NodeB (eNodeB or eNB), a new radio (NR) NB (also referred to as a gNB), a remote radio unit (RRU), a radio header (RH), a remote radio head (RRH), road side unit (RSU) a relay, a low power node such as a femto, a pico, and so forth, depending on the applied terminology and technology.

The term “terminal device” refers to any end device that may be capable of wireless communication. By way of example rather than limitation, a terminal device may also be referred to as user equipment (UE), a subscriber station (SS), a portable subscriber station, an mobile station (MS), or an access terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an internet of things (IoT) device (e.g., passive or ambient IoT device), a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms “terminal device”, “terminal”, “user equipment” or “UE” may be used interchangeably.

The term “positioning entity” refers to an entity, element or component within or connected to new generation radio access network (NG-RAN), for example, an access and mobility management function (AMF) entity, location management function (LMF) entity and an mobility management entity (MME). The positioning entity may be an entity in the NG-RAN configured for performing a certain functionality, such as positioning. In the following description, the terms “positioning entity”, “server entity”, “LMF” may be used interchangeably.

3GPP positioning technology is based on the transmission of positioning reference signal (PRS) that are transmitted from a gNB-controlled transmission reception point (TRP). The PRS configuration is uniquely based on the TRP identification (ID), which is an 8-bit downlink PRS ID information element in assistance information.

In the context of positioning integrity, one of the key problem is how to recognize if a given PRS transmission is affected by a major timing error. The major timing error may degrade the accuracy of a target UE positioning, irrespective of whether the error is intentional or unintentional.

An intentional error may be due to malicious replication or jamming by a spoofer, i.e. a network node that emulates a legitimate PRS transmissions with the intention to cause harm. An unintentional error may be due to corrupted timing of a malfunctioning TRP, or excessively long non-line-of-sight (NLOS) propoagation with respect to direct line-of-sight (LOS) path.

Another key problem is how to estimate the magnitude of the major timing error. The capability to estimate the magnitude of the major timing error is important to support integrity monitoring efficiently and adaptive mitigation measures. For example, if integrity key performance indexes (KPIs) of current PRS exceed certain thresholds related to requirements of positioning quality-of-service (QoS) for the target UE, an alternative PRS resource selection may be provided. For example, maximum timing error may be used as one of the integrity KPI as measure of minimum accuracy.

There is currently no known solution to the problem of joint detection and quantification of positioning error as part of integrity monitoring which would be acceptable in 3GPP. In general, known anti-spoofing solutions are based on encrypting or other personalization of PRS signals, i.e. by using UE or gNB-specific secret sequence to generate PRS. A spoofer would then be unable to replicate correctly such sequence and become detectable by the target UE when measuring the PRS.

However, these known anti-spoofing solutions are not possible to be adopted in 3GPP because PRS in 3GPP context is standardized to be a simple generic sequence of a known format, length and offset. The requirement to meet backward compatibility and reliability as well as complexity constraints exclude the potential adoption of the known anti-spoofing solutions.

In summary, there is a need to provide anti-spoofing solution which utilizes PRS in 3GPP context for adopting NR positioning integrity.

According to embodiments of the present disclosure, there is provided a solution, in particular signalling framework, for IoT. With this solution, a terminal device obtains timing advance, TA, information of one or more network nodes. The TA information indicates at least a TA value. The TA value corresponds to one of the one or more network nodes. Moreover, the terminal device performs integrity check of a PRS using the obtained TA information of the one or more network nodes, or alternatively, the terminal device reports to a location management function, LMF, the obtained TA information of the one or more network nodes for the integrity check of the PRS.

The provided solution is based on two observations. The first observation is multi-path propagation and/or spoofers create additional peaks in energy profile of received PRS due to the presence of PRS replicas. The legitimate PRS peak, i.e. the peak of the energy profile of PRS transmitted by a legitimate network node, should be aligned with uplink timing advance (TA) obtained during initial random access channel (RACH) when setting up the radio resource control (RRC) connection.

The second observation is the specified small data transmission (SDT) mechanism allows UEs to engage with any reachable gNB in a given RAN notification area (RNA). The RNA comprises of group of cells pre-defined for paging purpose, which importantly includes neighbouring gNBs in which the UE does not have prior communications with. The UE could initiate communication with these neighbouring gNBs using message 1 or A in SDT mechanism.

More specifically, any UE in RRC_CONNECTED mode has a TA updated by its serving gNB. However, in positioning, a UE measures signals from neighbouring gNBs. Therefore, the UE may use SDT mechanism to establish contact with non-serving gNBs without having any prior connection with these gNBs. This can be performed even in RRC_INACTIVE mode, for both serving and non-serving gNBs.

Accurate TA information is delivered from the gNB as part of any SDT communication using message 2 or B. The TA information effectively corresponds to the distance between the UE and gNB. According to 3GPP specifications, the basic unit for TA adjustment provided by the gNB is the sampling period (for example, 32.55 nanoseconds, ns, for the shortest frequency range 1, FR1, cyclic prefix). This implies high spatial resolution (32.55 ns×speed of light) with respect to cell size (i.e. 100 to 1000 of meters), i.e. 1% granularity or lower.

These observations are used to solve the above-mentioned problem of positioning integrity and error quantification.

Hereinafter, principle and embodiments of the present disclosure will be described in detail below with reference to the accompanying drawings. Reference is first made to FIG. 1, which illustrates an example radio network 100 in which example embodiments of the present disclosure can be implemented.

The radio network 100, which may be a part of a communication network, comprises a terminal device 110, one or more network nodes 120 which communicates with the terminal devices 110 and/or with at least one spoofer 130.

The radio network 100 may comprise any suitable number of network nodes 120 and spoofer 130. In the radio network 100, the terminal device 110 and the network node(s) 120 can exchange data and control information each other. A link from the network node(s) 120 to the terminal device 110 may be referred to as a downlink (DL), while a link from the terminal device 110 to the network node(s) 120 may be referred to as an uplink (UL).

A link in the present disclosure may be a communication channel that connects two or more devices for transmission of data or signalling. The link may be a dedicated physical link or a virtual circuit that uses one or more physical links or shares a physical link with other links.

It is to be understood that the devices are shown in the radio network 100 only for the purpose of illustration, without suggesting any limitation to the scope of the present disclosure. In some example embodiments, the radio network 100 may comprise one or more further devices to communicate with the terminal device 110, network node(s) 120 or spoofer 130.

The communications in the radio network 100 may follow any suitable communication standards or protocols, which are already in existence or to be developed in the future, such as Universal Mobile Telecommunications System (UMTS), long term evolution (LTE), LTE-Advanced (LTE-A), the fifth generation (5G) New Radio (NR), Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), Carrier Aggregation (CA), Dual Connectivity (DC), and New Radio Unlicensed (NR-U) technologies.

The spoofer 130 may be referred as a communication apparatus that emulates a legitimate PRS transmissions with the intention to cause harm in the present disclosure. The spoofer 130 may emulate and transmit signals which are typically transmitted by a legitimate network node. Because of this, the spoofer 130 may appear to be a legitimate device from the terminal device 110 perspective, but the spoofer 130 may be a maliciuous or illegitimate network node in the radio network 100.

As discussed above, the generic PRS design by 3GPP and public availability of positioning assistance data allow arbitrary and undetectable spoofing of PRS signals transmitted by the spoofer 130. For example, the spoofer 130 may transmit a replica of PRS by network node(s) 120. This situation may cause the terminal device 110 to estimate the distance of network node(s) 120 wrongly. This estimation error in the terminal device 110 is also unknown by terminal device 110 itself which makes mitigation more difficult.

Figure 2A:
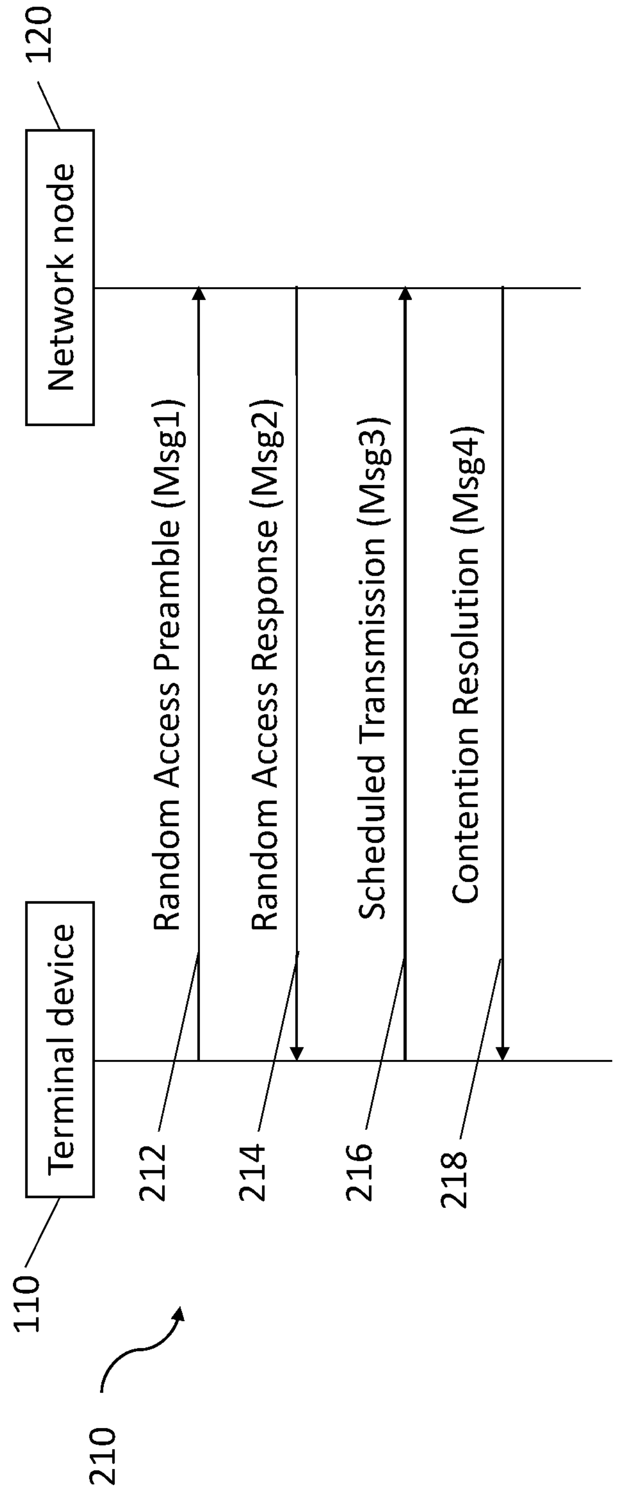
FIG. 2*a* illustrates an example flowchart of a 4-step random access channel method in which example embodiments of the present disclosure may be implemented.

FIG. 2*a* illustrates a example signalling flowchart of a 4-step RACH SDT procedure 210 implemented at a terminal device 110 and network node 120 according to example embodiments of the present disclosure. For the purpose of discussion, the method 210 will be described from the perspective of the terminal device 110 and network node 120 with reference to FIG. 1.

As shown in FIG. 2*a*, in step 212, the terminal device 120 in RRC_INACTIVE mode may send a random access preamble message to the network node 120. The random access preamble message may also referred as initial random access request message, message 1 or Msg 1. In some example embodiments, the initial random access request message may indicate to the network node 120 that the purpose of the SDT transmission is to obtain a valid TA value. In some example embodiments, a flag in Msg 1 may be raised as an indication indicating to the network node 120 that the purpose of the SDT transmission is to obtain a valid TA value.

In step 214, upon receiving random access preamble message, the network node 120 may measure or calulate a TA based on the received preamble and send a random access response message back to the terminal device 110. The random access response message may be referred as message 2 or Msg 2. In some example embodiments, the random access response message may comprise the measured or calculated valid TA value. As described above, the TA value provided by the network node 120 may be determined with sampling period accuracy.

In step 216, the terminal device 110 may send scheduled transmission (which may be referred as message 3 or Msg 3) to the network node 120. In step 218, the network node 120 may send back contention resolution (which may be referred as message 4 or Msg 4) to terminal device 110. For a contention-free RACH procedure, step 218 may not be applicable after step 216. It should be noted that step 216 and 218 may be optional if the SDT procedure is only for TA obtaining purpose.

In some example embodiments, Msg 1 in step 212 may indicate to the network node 120 that subsequent steps 216 and 218 is not required and/or not of interest of the terminal device 110. In other words, the Msg1 indicates to the network node 120 to abandon and/or terminate the 4-step RACH SDT procedure after the delivery of Msg 2 in step 214, without waiting for expiry of standardized timers for UE response time deadline. In some example embodiments, the indication may be a pre-configured preamble configured via RRC message or system information block (SIB).

In some example embodiments, the intention of network node 120 to abandon or terminate the 4-step RACH SDT procedure may be explicitly indicated in Msg 2, e.g. using a dedicated flag in Msg 2). In some example embodiment, the indication may be a simple binary field.

In some example embodiments, the intention of network node 120 to abandon or terminate the 4-step RACH SDT procedure may be implicitly understood by network node 120 and/or terminal device 110. For example, if the Msg 2 is a response message to Msg 1 which indicating only the need to obtain TA value from given network node 120, both terminal device 110 and/or network node 120 may terminate remaining steps 216 and 218. For example, if a dedicate preamble is used for SDT transmission, both UE and network will know only two steps are needed for the RACH SDT procedure.

Figure 2B:
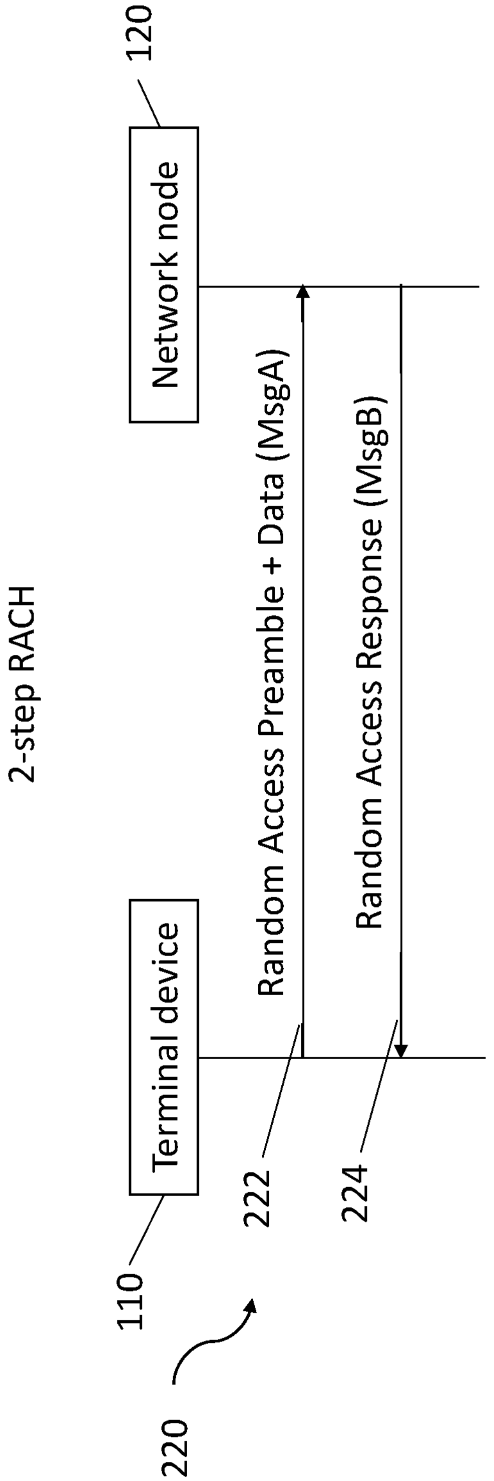
FIG. 2*b* illustrates an example flowchart of a 2-step random access channel method in which example embodiments of the present disclosure may be implemented.

FIG. 2*b* illustrates a example signalling flowchart of a 2-step RACH SDT procedure 220 implemented at a terminal device 110 and network node 120 according to example embodiments of the present disclosure. For the purpose of discussion, the method 220 will be described from the perspective of the terminal device 110 and network node 120 with reference to FIG. 1.

As shown in FIG. 2*b*, in step 222, the terminal device 110 may send a message comprising at least random access preamble and/or data to the network node 120. The message may also be referred as message A or Msg A. In some example embodiment, Msg A may indicate to the network node 120 that the purpose of the SDT transmission is to obtain a valid TA value. In some example embodiments, a flag in Msg A may be included as an indication indicating to the network node 120 that the purpose of the SDT transmission is to obtain a valid TA value. In some example embodiment, the data in the Msg A may be the indication for indicating to the network node 120 that the purpose of the SDT transmission is to obtain a valid TA value. In some example embodiment, the preamble may indicate the purpose of the SDT transmission is to obtain a valid TA value, and the preamble may be pre-configured or configured via for example RRC message or SIB.

In step 224, upon receiving random access preamble message, the network node 120 sends a random access response message back to the terminal device 110. The random access response message may be referred as message B or Msg B. In some example embodiments, the Msg B may comprise the requested valid TA value. As described above, the TA value provided by the network node 120 may be determined with sampling period accuracy.

In some example embodiments, the network node(s) 120 in the same RNA may reserve a given RACH resource for all network node(s) 120. This may enable the same Msg 1 or Msg A from the terminal device 110 to trigger multiple network node(s) 120. Advantageously, RACH resource efficiency can be optimized and signalling overhead can be reduced.

In some example embodiments, power transmission for both terminal device 110 and/or network node(s) 120 may be adapted to ensure sufficient range. However, the network node(s) 120 may have to reply their Msg 2 in a non-colliding manner if multiple network nodes(s) are triggered using same RACH resource as described above. In some example embodiments, a random backoff or pre-configured order (e.g. based on physical cell ID, PCI) may be used to determine the order of network node(s)'s 120 transmissions in time.

Figure 5:
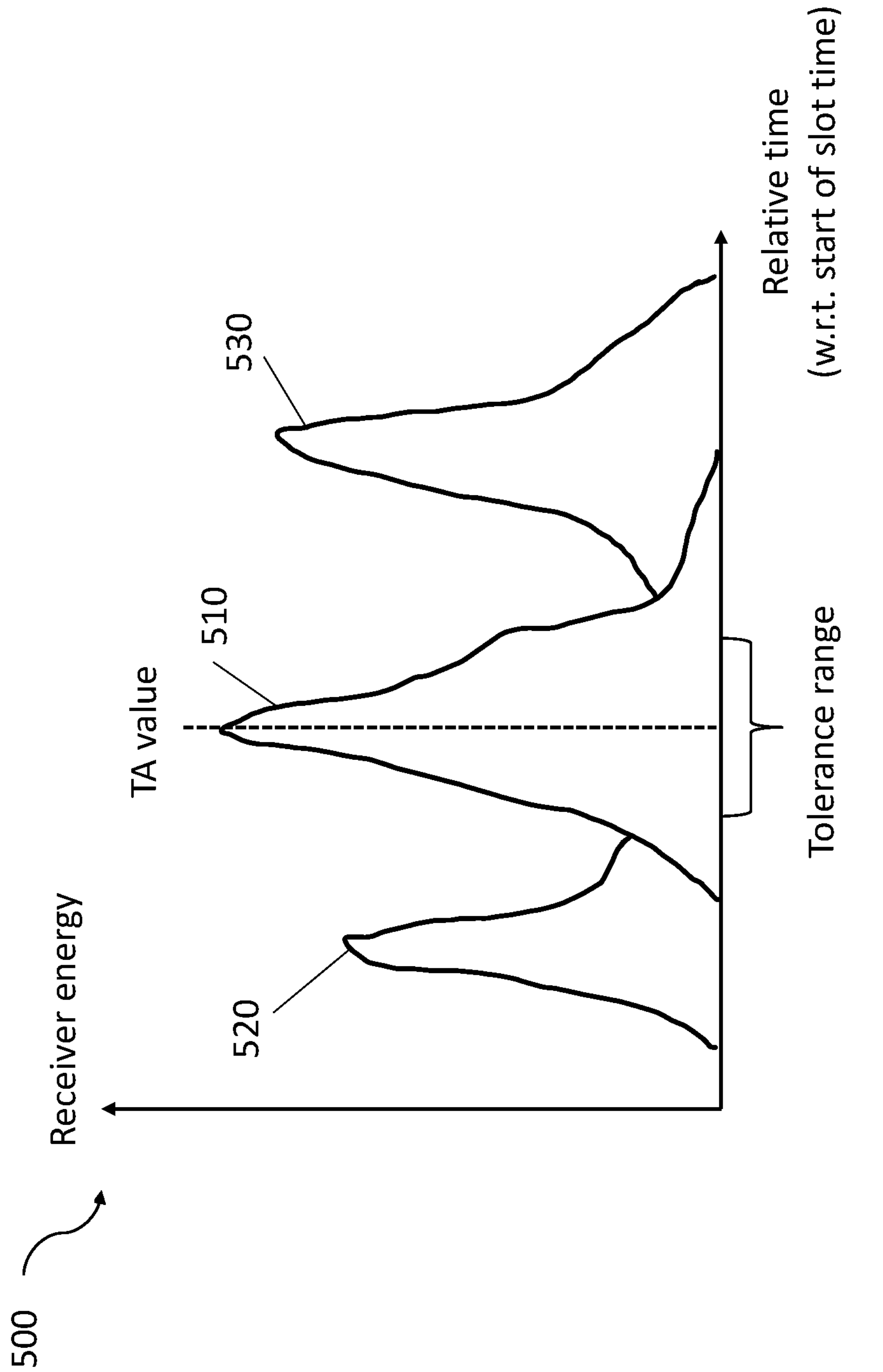
FIG. 5 illustrates an example profiles of receiver's energy of positioning reference signals with respect to start of slot time in which example embodiments of the present disclosure may be implemented.

FIG. 5 illustrates profiles of receiver's energy of positioning reference signals with respect to start of slot time. The receiver's energy may be in decibel (dB) or decibel-milliwatts (dBm). The receiver may be integrated in the terminal device 110 or a positioning entity or a LMF. As shown in FIG. 5, in graph 500, profile 510 may be a legitimate PRS. A legitimate PRS is a PRS transmitted by a legitimate or valid network node. A legitimate or valid network node may not be an attacker or spoofer network node which transmits replica and/or malicious PRS. The peak of the profile 510 may always match or align with the TA value or TA information of the valid network node.

As shown in FIG. 5, profile 520 may be a replica of a PRS. The profile 520 may be a PRS transmitted by a non-legitimate network node. A non-legitimate network node may be an attacker or spoofer network node (herein referred as spoofer). Because the spoofer does not know the TA value or TA information of the legitimate PRS, the peak of the profile 520 may not match or align the TA value or TA information of the legitimate PRS. In this case, the profile 520 is an early PRS replica, i.e. the peak of the profile 520 is earlier in terms of time slot, than TA the value or TA information of the profile 510.

As shown in FIG. 5, profile 530 may be a replica of a PRS. The profile 530 may be a PRS transmitted by a legitimate network node. However, the profile 530 may suffer from non-line-of-sight (NLOS) propagation delay which leads to a delayed PRS replica, i.e. the peak of the profile 530 is later than TA value of the profile 510. Similarly to the profile 520, the profile 530 may also be a PRS transmitted by a spoofer. The spoofer may transmit the PRS at a time slot later than the TA value because the spoofer does not know the TA value or TA information of the legitimate PRS.

As shown in FIG. 5, a tolerance range may be used to determine whether the a PRS received by the receiver is legitimate or valid. This may be used in an integrity check procedure of a PRS used for positioning. The tolerance range may be a pre-defined tolerance interval around the TA value. For example, if the main peak of the PRS used for positioning is within the tolerance range, it may be determined that the PRS received is valid or legitimate for positioning. If the main peak of the PRS used for positioning is outside the tolerance range, it may be determined that the PRS received is illegitimate or invalid. This may be used for triggering further measurements for mitigation. This may also used to indicate to the LMF about the received PRS is suspicious and may be potentially a spoofer.

Figure 3:
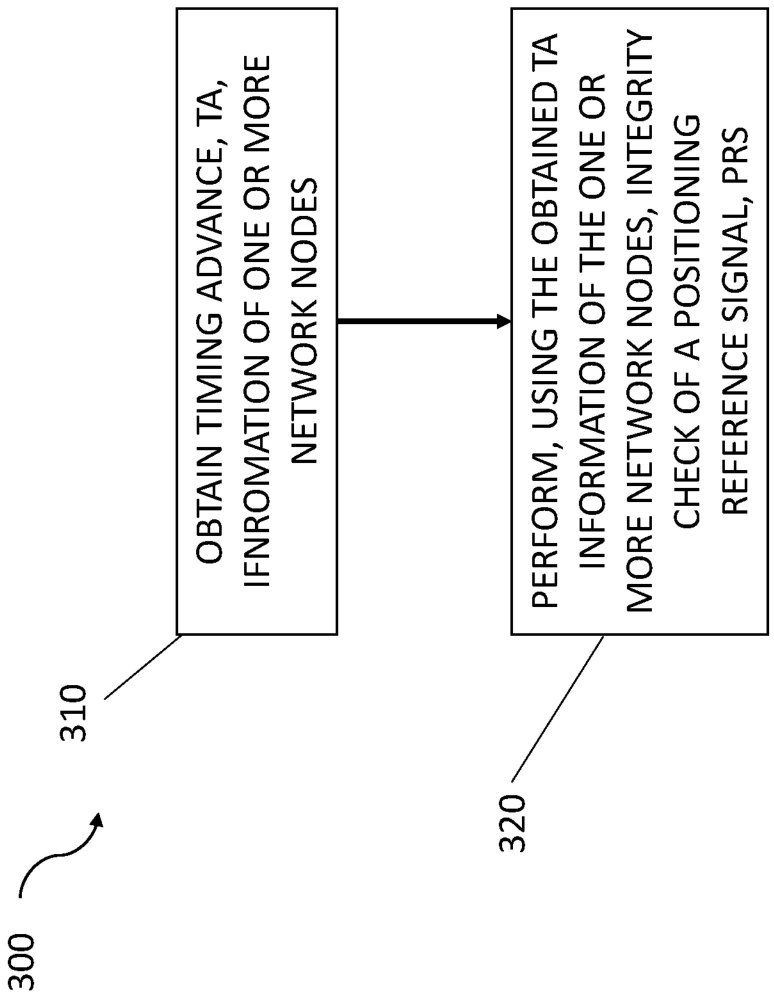
FIG. 3 illustrates an example flowchart of a method implemented at a terminal device according to example embodiments of the present disclosure.

FIG. 3 illustrates a flowchart of an example method 300 implemented at a terminal device (for example, the terminal device 110) in according to example embodiments of the present disclosure. For the purpose of discussion, the method 300 will be described from the perspective of the terminal device 110 with reference to FIG. 1.

As shown in FIG. 3, at block 310, the terminal device 110 obtains timing advance, TA, information of one or more network nodes 120. The TA information indicates at least a TA value. The TA value may correspond to one of the one or more network nodes 120. The terminal device 110 performs integrity check of a positioning reference signal, PRS, using the obtained TA information of the one or more network nodes 120, or report, to a location management function, LMF, the obtained TA information of the one or more network nodes 120 for the integrity check of the PRS.

The above method 300 enables the terminal device 110 to determine the authenticity of the PRS, for example to determine whether the transmission of the PRS is from a genuine network node, or from a malicious network node (e.g., a spoofer) or a malfunctioning network node (e.g., a misconfigured network node). Advantageously, the integrity check of the PRS and/or the TA information enables the terminal device 110 to identify spoofing of PRS and perform necessary mitigation actions to avoid positioning error of the terminal device 110.

In some example embodiments, the terminal device 110 may identify one of the one or more network nodes 120, in which the PRS transmitted by the identified one network node may be tested for integrity check. This may be performed based on positioning assistance data obtained from the LMF.

For examples, NR-DL-PRS-AssistanceData field in LTE positioning protocol (LPP) Common Information Elements may comprise DL-PRS-ID-Info field and NR-DL-PRS-AssistanceDataPerTRP field. The DL-PRS-ID-Info field may comprise information about the PRS and the NR-DL-PRS-AssistanceDataPerTRP field may comprise of the identification of the one or more network nodes 120.

In some example embodiments, the terminal device 110 may collect the TA information of the one or more network nodes 120. The collected TA information of the one or more network nodes 120 may be used for performing the integrity check of the PRS by the terminal device 110. In some example embodiments, the terminal device 110 may collect the TA information of the one or more network nodes 120 for performing the integrity check of the PRS by the LMF.

In some example embodiments, the collection of TA information may be triggered by any network node. For example, the terminal device 110 may start proactively collecting the TA information to assist the LMF with integrity check of PRS. The terminal device 110 may deliver the measured or obtained TA information to the LMF. This may be delivered using extended or adapted enhanced cell identity (ECID) reporting mechanism. In addition, a physical cell ID (PCI) and/or a beam index of the network node may be included in the TA information for angle-of-arrival (AoA) enhancements. Alternatively, the terminal device 110 may tag PRS measurement with associated TA information, or a flag indicating the availability of the TA information.

In some example embodiments, the terminal device 110 may transmit to one or more network nodes 120, an indication for obtaining the TA information. In some example embodiments, the indication for obtaining the TA information may be indicated in message 1 of 4-step RACH or message A of 2-step RACH. In some example embodiments, the indication for obtaining the TA information may comprise at least a binary field or a preconfigured preamble.

In some example embodiments, the terminal device 110 may obtain the TA information from the one or more network nodes 120 in RRC_CONNECTED mode. In RRC_CONNECTED mode, a serving network nodes from the one or more network nodes 120 may maintain the TA information, by default, with the terminal device 110 using RRC procedures, for example, via system information. In some example embodiments, the terminal device 110 may obtain the TA information via medium access channel (MAC) control element (CE) update.

In RRC_CONNECTED mode, the TA information may be obtained from the serving network node directly via the legacy via initial Random Access procedure or Timing Advance Command MAC CE. This allows for efficient fine-grained collection of the TA as function of the terminal device's own mobility (that is, UE-observed changes of signal strength). This leaves the spoofer only with the option to emulate non-serving network nodes.

In some example embodiments, the terminal device 110 may obtain the TA information from the one or more network node 120 using SDT procedure. In some example embodiments, the terminal device 110 may use SDT procedure for obtaining TA information when the one and more network node 120 is a non-serving network node.

In some example embodiments, the terminal device 110 may use SDT procedure for obtaining TA information when the terminal device 110 is in RRC_INACTIVE mode. For this case, the identified network node may need to be confirmed as part of the RAN-based notification area (RNA) of the terminal device 110. In some example embodiments, the terminal device may use system information from the one of more network nodes 120 to determine active RACH resources for SDT procedure.

In some example embodiments, the one or more network nodes 120 in the same RAN may share same pre-defined SDT resources to allow a single SDT broadcast transmission by the terminal device 110 to all network nodes at the same time. Advantageously, this may reduce signalling overhead. However, this option may require coordination of the message 2 in SDT procedure (e.g. random backoff, PCI-based ordering or central pre-configuration) in order to deliver the TA information in a sequential non-conflicting manner.

In some example embodiments, the TA information may be obtained by the terminal device 110 using a legacy message (e.g. message 1 or message A is used to request for the TA information). In some example embodiments, the terminal device 110 may use a modified signalling message e.g. a modified message 1 or message A indicates that the sole purpose of this SDT transmission is to obtain a valid TA, or request the one or more network nodes 120 to perform other actions such as forwarding of the TA information to other network nodes or LMF. In some example embodiments, the terminal device 110 may receive an indication from the one or more network nodes to interrupt or terminate the ongoing SDT procedure. This may be done explicitly (e.g. via a dedicated flag in message 2) or implicitly (e.g. via a specific preamble in message 1).

In some example embodiments, the terminal device 110 may reports, to the location management function, LMF, the obtained TA information of the one or more network nodes for the integrity check of the PRS. In some example embodiments, the terminal device 110 may transmit to the LMF the obtained TA information via long term evolution, LTE, positioning protocol (LPP). In some example embodiments, the terminal device 110 may transmit to the LMF the obtained TA information via sidelink positioning protocol, SLPP. For example, an ECID-SignalMeasurementInformation field may comprise an optional ASN.1 information element dedicated for signalling the TA information. To this end, the eCID localization process may be setup as part of the integrity check by the LMF.

In some example embodiments, the terminal device 110 may request a positioning measurement gap for collecting TA information of one or more neighbouring network nodes. Autonomous gaps for positioning measurements may be used, as the gaps are sufficiently long (10/20 ms). Standard radio resource management (RRM) measurement gaps may be used as well for SDT exchange assuming the target network node responds within the duration of the measurement gap. In some example embodiments, the terminal device 110 may collect TA information of one or more neighbouring network nodes without requesting the positioning measurement gap if measurement without gap can be supported by the terminal device 110.

In some example embodiments, the terminal device 110 may obtains the TA information of the one or more network nodes 120 when the terminal device 110 receives, from any one or more network nodes or LMF, an indication indicating the terminal device 110 to obtain the TA information. The indication may indicates that the terminal device 110 may start collecting the TA information when the terminal device 110 detects inconsistency in the PRS. The indication may be an implicit indication from one or mode network nodes 120 or a explicit indication from the LMF via LPP.

In some example embodiments, the terminal device 110 may obtains the TA information of the one or more network nodes 120 when the terminal device 110 is configured with an integrity class. For examples, the terminal device 110 configured as an integrity class, may have a duty to collect certain amount of TA information from a certain number of network nodes 120. This configuration may be provided to terminal device 110 via assistance information.

In some example embodiments, the terminal device 110 may obtains the TA information of the one or more network nodes 120 when the terminal device 110 moves to another serving network node. In some example embodiments, the terminal device 110 may obtains the TA information of the one or more network nodes 120 when the terminal device 110 performs radio access network, RAN-based notification area, RNA change or update.

Then, as shown in FIG. 3, at block 320, the terminal device 110 performs, using the obtained TA information of the one or more network nodes 120, integrity check of a PRS. In some example embodiments, the terminal device 110 may use the obtained TA information for integrity check of the PRS resource associated with the one or more network nodes 120.

In some example embodiments, the terminal device 110 may verify whether a reference value of the PRS used for positioning is within an interval range around the TA value of the one or more network nodes 120. The reference value may be defined based on a pulse detection criterion, for example, signal amplitude is above a threshold, signal slop is above a threshold, or a signal maximum of a fraction of the signal maximum is reached. The reference value may be a filtered value, such as rolling average, to remove noise and random fluctuations. The reference value may be defined in unit of dB or dBm.

In some example embodiments, the terminal device 110 may verify whether a peak of the PRS energy profile used of positioning is aligned with the TA value of the one or network nodes 120.

As discussed above, if the main peak of the PRS used for positioning is within the interval range, the terminal device 110 may determine that the PRS received is valid or legitimate for positioning. If the main peak of the PRS used for positioning is outside the interval range, the terminal device 110 may determine that the PRS received is illegitimate or invalid. In some example embodiments, an outcome of the determination may be stored or included in a result, e.g. an integrity check result of the PRS.

In some example embodiments, the terminal device 110 may transmit, to the LMF, an indication of the integrity check result of the PRS. In some example embodiments, the PRS tested for integrity check and/or the corresponding measurements may be tagged with a warning flag in a message to the LMF. Based on the message to the LMF, the corresponding PRS and/or the spoofer 130 may be removed from positioning session. Alternatively, a new anchor or one from the one or more network nodes 120 may be selected for positioning.

In some example embodiment, the terminal device 110 may receive a request or response from the LMF to use the TA information to replace the missing PRS measurements until a new and creditable anchor or PRS is activated.

Figure 4:
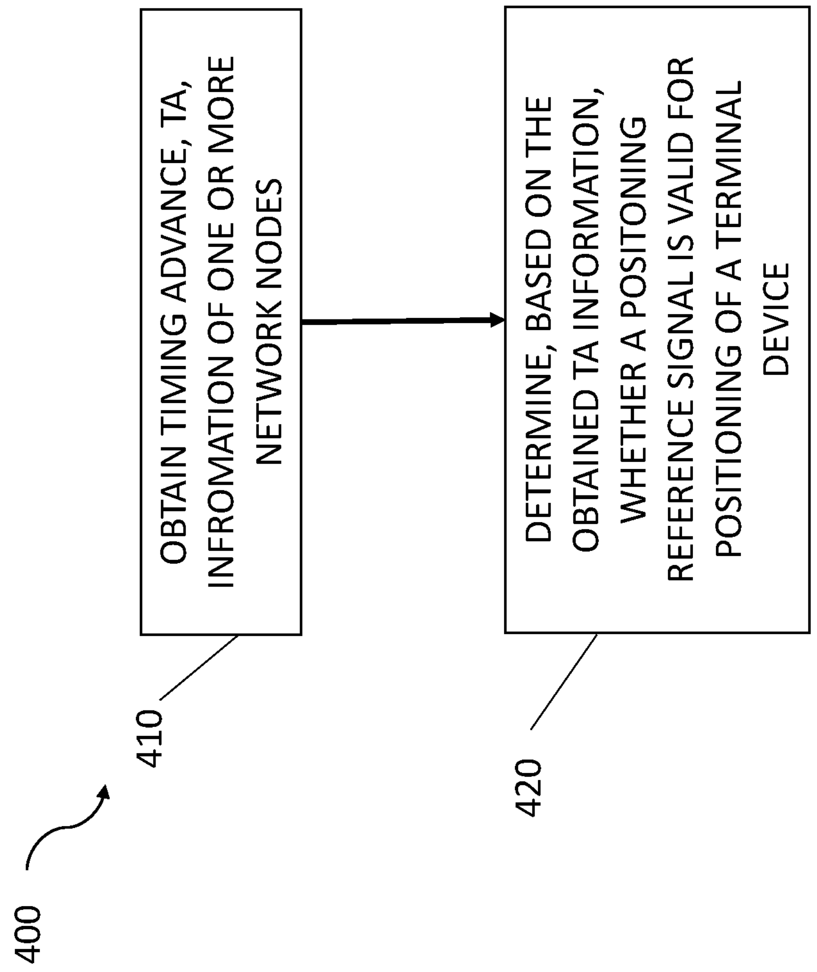
FIG. 4 illustrates an example flowchart of a method implemented at a positioning entity according to example embodiments of the present disclosure.

FIG. 4 illustrates a flowchart of an example method 400 implemented at a positioning entity (for example, a location management function, LMF) in according to example embodiments of the present disclosure. The positioning entity may refer to a positioning server or the LMF as discussed above. For the purpose of discussion, the method 400 will be described from the perspective of the positioning entity.

As shown in FIG. 4, at block 410, the positioning entity obtains TA information of the one or more network nodes 120. The TA information may indicate at least a TA value. The TA value may correspond or associate to one or more network nodes 120. The positioning entity determines, based on the obtained TA information or integrity check result, whether the PRS is valid for positioning of the terminal device 110.

The above method 400 enables the the LMF to determine the authenticity of the PRS, for example, to determine whether the transmission of the PRS is from a genuine network node, or from a malicious (e.g., a spoofer), or a malfunctioning network node (e.g. a misconfigured network node). Advantagneously, the integrity check of the PRS and/or the TA information enables the LMF to identify spoofing of PRS and perform necessary mitigation actions to avoid positioning error of the terminal device 110.

In some example embodiments, the positioning entity may receive the TA information of the one or more network nodes 120, from the terminal device 110. In some example embodiments, the positioning entity may receive the integrity check result of the PRS, from the terminal device 110. In some example embodiments, the TA information of the one of more network nodes 120 may be received from the terminal device 110 via long term evolution, LTE, positioning protocol, LPP, or sidelink positioning protocol, SLPP. In some example embodiments, the integrity check result of the PRS may be received from the terminal device 110 via long term evolution, LTE, positioning protocol, LPP, or sidelink positioning protocol, SLPP.

In some example embodiments, the positioning entity may receive, from the one or network nodes 120, the TA information of the one of more network nodes 120. In some example embodiments, the TA information of the one or more network nodes may be received from the one or more network nodes 120 via new radio, NR, positioning protocol A, NRPPa. For example, a dedicated field in the NRPPa may be specified in the future to provide for a more robust method. In this case, an external spoofer may not be able to gain internal access to the LMF via a serving AMF and pass the associated NAS authentication.

In some embodiments, the positioning entity may command the terminal device 110 to start collecting the timing advance information when there is inconsistency of the PRS. The command may be a indirect command from the one or more network nodes 120. The command may be an explicit command from the positioning entity to the terminal device 110 via LPP or SLPP. Alternatively, the command may be from assistance information received by the terminal device 110.

In some example embodiments, the positioning entity obtains an integrity check result of the PRS. The PRS may be associated with one or more network nodes 120. In some example embodiments, the integrity check result is obtained from the terminal device 110. In some example embodiments, the positioning entity may obtain the integrity check result via LPP or SLPP.

Then, as shown in FIG. 4, at block 420, the positioning entity determines whether the PRS is valid for positioning of a terminal device 110, based on the obtained TA information. In some example embodiments, the positioning entity may verify whether reference value of the PRS used for positioning is within an interval range around the TA value of the one or more network nodes 120. In some example embodiments, the positioning entity may use the obtained TA information for integrity check of the PRS resource associated with the one or more network nodes 120.

In some example embodiments, the positioning entity may verify whether a peak of the PRS energy profile used of positioning is aligned with the TA value of the one or network nodes 120. As discussed above, if the main peak of the PRS used for positioning is within the interval range, the positioning entity may determine that the PRS received is valid or legitimate for positioning. If the main peak of the PRS used for positioning is outside the interval range, the positioning entity may determine that the PRS received is illegitimate or invalid.

In some example embodiments, the positioning entity determines whether the PRS is valid for positioning of a terminal device 110, based on the obtained integrity check result. In some example embodiments, the PRS tested for integrity check and/or the corresponding measurements may be tagged with a warning flag in the obtained integrity check result. Based on the integrity check result, the positioning entity may remove the corresponding PRS and/or the spoofer 130 from positioning session. Alternatively, the positioning entity may select a new anchor or one from the one or more network nodes 120 for positioning.

In some example embodiments, the positioning entity may send a request or response from to the terminal device 110 to use the TA information to replace the missing PRS measurements until a new and creditable anchor or PRS is activated.

In some example embodiments, the positioning entity may transmit an indication to the terminal device 110. The indication may indicate to the terminal device 110 to obtain the TA information of the one or more network nodes 120. In some example embodiments, the indication may be transmitted to the terminal device 110 via LTE positioning protocol, LPP, or sidelink positioning protocol, SLPP.

In some example embodiments, an apparatus capable of performing any of operations of the method 300 (for example, the terminal device 110) may include means for performing the respective steps of the method 300. The means may be implemented in any suitable form. For example, the means may be implemented in a circuitry or software module.

In some example embodiments, the apparatus may comprise means for obtaining timing advance, TA, information of one or more network nodes. The TA information may indicate at least a TA value. The TA value may correspond to one of the one or more network nodes. In some example embodiments, the apparatus may comprise means for performing, using the obtained TA information of the one or more network nodes, integrity check of a positioning reference signal, PRS. In some example embodiments, the apparatus may comprise means for reporting, to a location management function, LMF, the obtained TA information of the one or more network nodes for the integrity check of the PRS.

In some example embodiments, the apparatus may further comprise means for performing other steps in some embodiments of the method 300. In some example embodiments, the apparatus may further comprise means for performing steps described in above embodiments performed by the terminal device 110. In some example embodiments, the means comprises at least one processor and/or at least one memory which may include computer program code. The at least one memory are configured to, with the at least one processor, cause the performance of the apparatus.

In some example embodiments, an apparatus capable of performing any of the method 400 (for example, the positioning entity) may include means for performing the respective steps of the method 400. The means may be implemented in any suitable form. For example, the means may be implemented in a circuitry or software module.

In some example embodiments, the apparatus may comprise means for obtaining timing advance, TA, information of one or more network nodes, or an integrity check result of a positioning reference signal, PRS, wherein the TA information indicates at least a TA value corresponding to one of the one or more network nodes. In some example embodiments, the apparatus may comprise means for determining, based on the obtained TA information or integrity check result whether the PRS is valid for positioning of a terminal device.

In some example embodiments, the apparatus may further comprise means for performing other steps in some embodiments of the method 400. In some example embodiments, the apparatus may further comprise means for performing steps described in above embodiments performed by the positioning entity. In some example embodiments, the means comprises at least one processor and at least one memory including computer program code. The at least one memory and computer program code are configured to, with the at least one processor, cause the performance of the apparatus.

Figure 6:
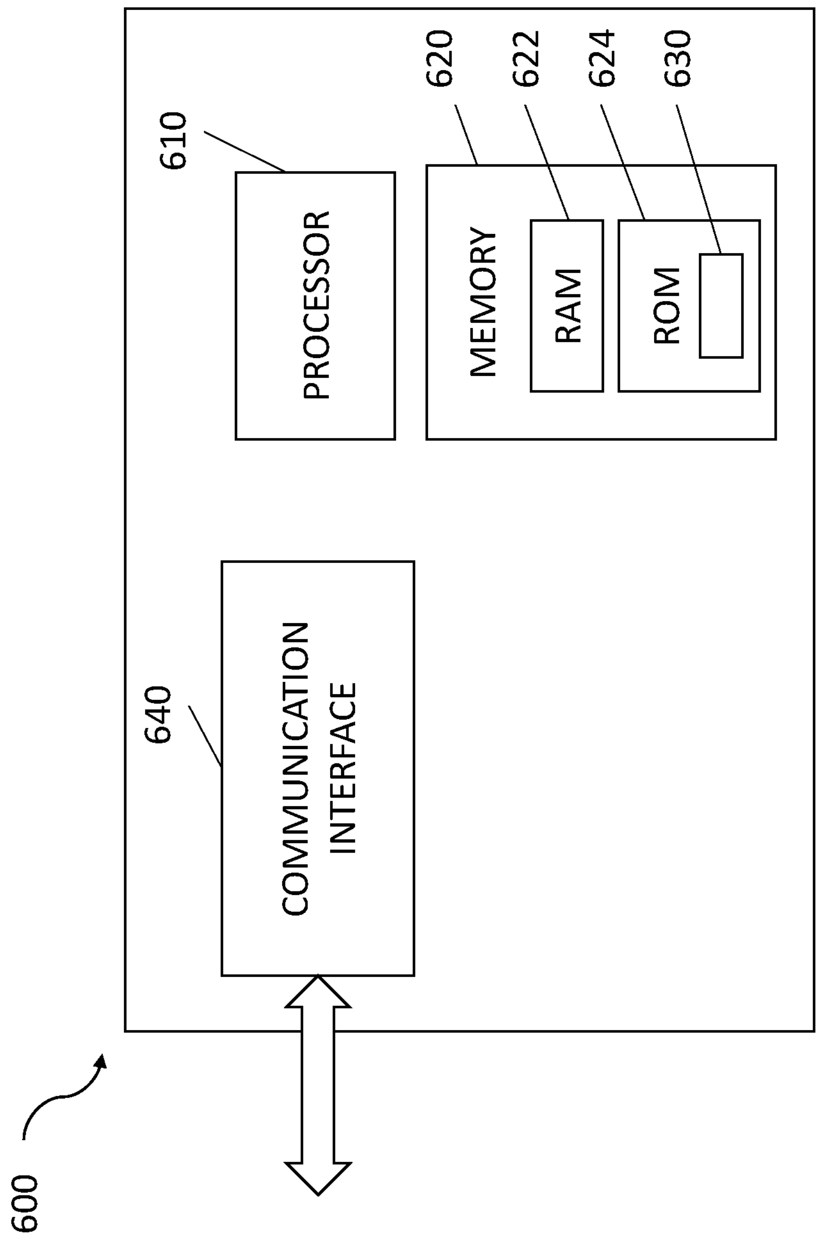
FIG. 6 illustrates an example simplified block diagram of a device that is suitable for implementing embodiments of the present disclosure.

FIG. 6 is a simplified block diagram of a device 600 that is suitable for implementing embodiments of the present disclosure. The device 600 may be provided to implement the communication device, for example the terminal device 110 or the network node 120 as shown in FIG. 1, or the positioning entity. As shown, the device 600 may include one or more processors 610, and/or one or more memories 620 which may be coupled to the processor 610, and one or more transmitters and/or receivers (TX/RX) coupled to the processor 610. The one or more transmitters and/or receivers (TX/RX) may be referred as communication interface 640 in FIG. 6.

The communication interface 640 may be for bidirectional communications. The communication interface 640 may have at least one antenna to facilitate communication. The communication interface may represent any interface that is necessary for communication with other network elements. The communication interface may be hardware or software based interface. For example, the communication interface may be one ore more transceivers. The one or more transceivers may be coupled to one or more antennas or antenna ports to wirelessly transmit and/or receive communication signals. The antennas or antenna ports may be the same or different types. The antennas or antenna ports may be located in different positions of an apparatus. The one or more transceivers allow the apparatus to communicate with other devices that may be wired and/or wireless. The transceiver may support one or more radio technologies. For example, the one or more transceivers may include a cellular subsystem, a WLAN subsystem, and/or a Bluetooth™ subsystem. The one or more transceivers may include processors, controllers, radios, sockets, plugs, buffers, or the like circuits to form one or more communication channels to one or more radio frequency units.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a read only memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that may be executed by the associated processor 610. The program 630 may be stored in the ROM 624. The processor 610 may perform any suitable actions and processing by loading the program 630 into the RAM 622.

The embodiments of the present disclosure may be implemented by means of the program so that the device 600 may perform any process of the disclosure as discussed with reference to FIGS. 2 to 4. The embodiments of the present disclosure may also be implemented by hardware or by a combination of software and hardware.

Figure 7:
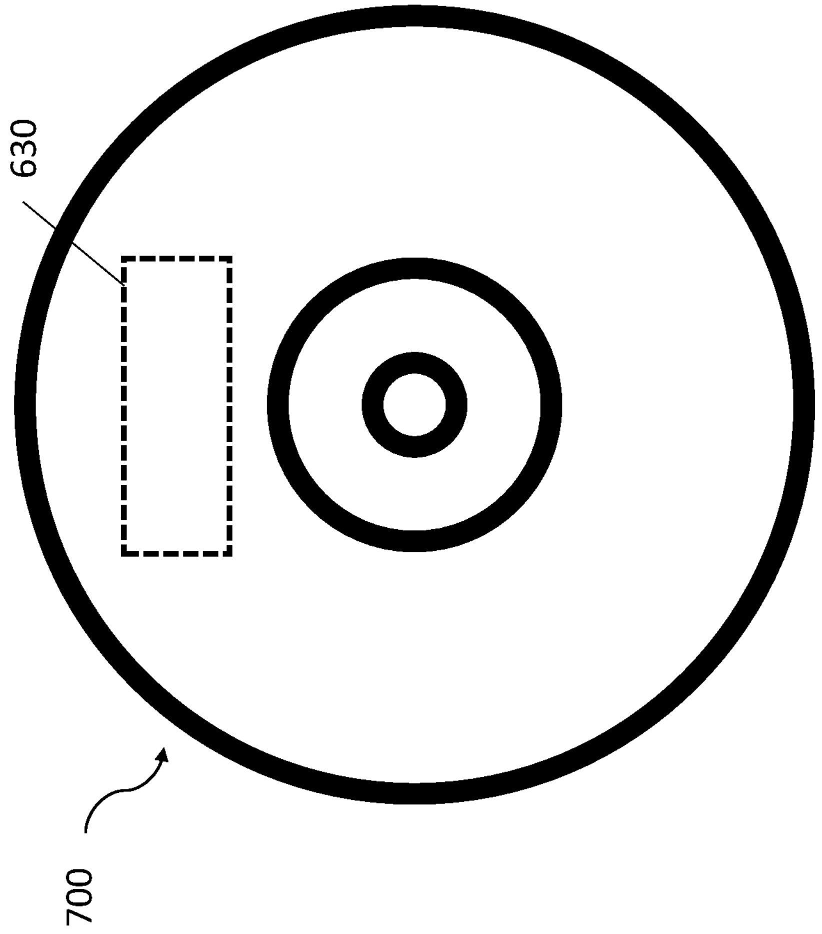
FIG. 7 illustrates an example block diagram of an example computer readable medium in accordance with some embodiments of the present disclosure.

In some embodiments, the program 630 may be tangibly contained in a computer readable medium which may be included in the device 600 (such as in the memory 620) or other storage devices that are accessible by the device 600. The device 500 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 300 or 400 as described above with reference to FIG. 3 and FIG. 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device, comprising:

at least one processor; and at least one memory storing instructions that, when executed by the at least one processor, cause the terminal device at least to:

obtain timing advance (TA) information of one or more network nodes, wherein the TA information indicates at least a TA value corresponding to one of the one or more network nodes, wherein the terminal device obtains the TA information of at least one non-serving network node from the one or more network nodes by initiating a small data transmission (SDT) procedure with the at least one non-serving network node in a radio access network based notification area (RNA), and wherein the terminal device is in RRC_INACTIVE mode when initiating the SDT procedure; and perform, using the obtained TA information of the one or more network nodes, integrity check of a positioning reference signal (PRS); or report, to a location management function (LMF), the obtained TA information of the one or more network nodes for the integrity check of the PRS.

2. The terminal device of claim 1, wherein the performing the integrity check of the PRS comprises:

verifying whether a reference value of the PRS used for positioning is within an interval range around the TA value of the one or more network nodes.

3. The terminal device of claim 1, wherein the terminal device is further caused to:

transmit, to the one or more network nodes, an indication for obtaining the TA information, wherein the indication is transmitted in message 1 of a 4-step or message A of a 2-step random access channel procedure.

4. The terminal device of claim 1, wherein the terminal device obtains the TA information of the one or more network nodes when at least one of the following is fulfilled:

the terminal device receives, from any one or more network nodes, an indication indicating the terminal device to obtain the TA information;

the terminal device is configured with an integrity class;

the terminal device moves to another serving network node; or the terminal device performs radio access network based notification area change or update.

5. A positioning entity comprising:

at least one processor; and at least one memory storing instructions that, when executed by the at least one processor, cause the positioning entity at least to:

determine a positioning reference signal (PRS);

obtain timing advance (TA) information of one or more network nodes, or an integrity check result of the PRS, wherein the TA information indicates at least a TA value corresponding to one of the one or more network nodes;

transmit, to a terminal device, a command to start collecting the timing advance information responsive to the positioning entity detecting an inconsistency in the PRS;

determine, based on the obtained TA information or integrity check result whether the PRS is valid for positioning of a terminal device;

upon determining that the PRS is invalid for positioning, at least one of: remove a corresponding network node from a positioning session, or select a new anchor network node for positioning of the terminal device; and transmit, to the terminal device, a request to use the TA information to replace missing PRS measurements until a new and creditable anchor or PRS is activated.

6. The positioning entity of claim 5, wherein the TA information of the one or more network nodes is received from the one or more network nodes via new radio positioning protocol A.

7. The positioning entity of claim 5, wherein the determining, based on the obtained TA information, whether the PRS is valid for positioning of the terminal device comprises:

verifying whether an energy peak of the PRS is within an interval range around the TA value of the one or more network nodes.

8. The positioning entity of claim 5, wherein the positioning entity is further caused to:

transmit, to the terminal device, an indication indicating to the terminal device to obtain the TA information of the one or more network nodes.

9. A method for a terminal device comprising:

obtaining timing advance (TA) information of one or more network nodes, wherein the TA information indicates at least a TA value corresponding to one of the one or more network nodes, wherein the obtaining comprises initiating a small data transmission (SDT) procedure with at least one non-serving network node from the one or more network nodes in a radio access network based notification area (RNA), and wherein the terminal device is in RRC_INACTIVE mode when initiating the SDT procedure; and performing, using the obtained TA information of the one or more network nodes, integrity check of a positioning reference signal (PRS); or reporting, to a location management function (LMF) the obtained TA information of the one or more network nodes for the integrity check of the PRS.

10. The method according to claim 9, wherein the performing the integrity check of the PRS comprises:

verifying whether an energy peak of the PRS used for positioning is within an interval range around the TA value of the one or more network nodes.

11. The terminal device of claim 1, wherein the terminal device is further caused to:

identify one of the one or more network nodes for the integrity check based on positioning assistance data obtained from the LMF, the positioning assistance data comprising at least one of an NR-DL-PRS-Assistance-Data field or a DL-PRS-ID-Info field; and obtain the TA information of a serving network node from the one or more network nodes in RRC_CONNECTED mode via a Timing Advance Command medium access channel (MAC) control element (CE) update.

12. The terminal device of claim 1, wherein the one or more network nodes in the RNA share a pre-defined SDT resource, such that a single SDT broadcast transmission by the terminal device triggers multiple network nodes, and wherein the multiple network nodes reply with respective TA information in a sequential non-conflicting manner based on at least one of a random backoff or a physical cell identity (PCI)-based ordering.

13. The terminal device of claim 1, wherein the terminal device is further caused to:

tag a PRS measurement with at least one of the obtained TA information or a warning flag indicating that the PRS is suspicious; and include, in the TA information, at least one of a physical cell identity (PCI) or a beam index of a corresponding network node for angle-of-arrival (AoA) enhancements.

14. The terminal device of claim 1, wherein the terminal device is further caused to:

receive, from the LMF, a request to use the TA information to replace missing PRS measurements until a new and creditable anchor or PRS is activated.

15. The terminal device of claim 1, wherein the performing the integrity check of the PRS comprises:

comparing a received energy profile of the PRS to the TA value, wherein a legitimate PRS transmitted by a valid network node has a peak of the energy profile aligned with the TA value, and wherein a PRS replica transmitted by a spoofer has a peak that is either earlier in time than the TA value or later in time than the TA value has a peak that is either earlier in time than the TA value or later in time than the TA value; and determining that the PRS is valid for positioning when a main peak of the energy profile is within a pre-defined tolerance interval around the TA value, and determining that the PRS is invalid for positioning when the main peak of the energy profile is outside the pre-defined tolerance interval.

16. The terminal device of claim 3, wherein the indication transmitted in the message 1 or the message A further indicates to the network node that subsequent steps of the random access channel procedure are not required, such that the random access channel procedure is terminated after delivery of a random access response message comprising the TA value, without waiting for expiry of standardized timers for a response time deadline.

17. The terminal device of claim 2, wherein the reference value of the PRS is defined based on a pulse detection criterion comprising at least one of: a signal amplitude above a threshold, a signal slope above a threshold, or a signal maximum of a fraction of the signal maximum being reached; and wherein the reference value is a filtered value comprising a rolling average to remove noise and random fluctuations.

18. The terminal device of claim 1, wherein the terminal device is further caused to:

transmit, to the LMF, the obtained TA information via at least one of a sidelink positioning protocol (SLPP) or an enhanced cell identity (ECID) reporting mechanism, wherein an ECID-SignalMeasurementInformation field comprises an information element dedicated for signalling the TA information.

19. The terminal device of claim 4, wherein, when the terminal device is configured with the integrity class, the terminal device has a duty to collect a certain amount of TA information from a certain number of network nodes, and wherein the integrity class configuration is provided to the terminal device via assistance information.

20. The positioning entity of claim 5, wherein the command to start collecting the timing advance information is transmitted via at least one of: an indirect command from the one or more network nodes, an explicit command from the positioning entity to the terminal device via long term evolution (LTE) positioning protocol (LPP) or sidelink positioning protocol (SLPP), or via assistance information received by the terminal device; and wherein the positioning entity obtains the integrity check result of the PRS from the terminal device via at least one of LPP or SLPP.

* * * * *